(12) United States Patent
Mehta

(10) Patent No.: US 11,138,913 B2
(45) Date of Patent: Oct. 5, 2021

(54) STATIC DISPLAY AND METHOD FOR MANUFACTURING THE SAME

(71) Applicant: Vinay K. Mehta, Maharashtra (IN)

(72) Inventor: Vinay K. Mehta, Maharashtra (IN)

(*) Notice: Subject to any disclaimer, the term of this patent is extended or adjusted under 35 U.S.C. 154(b) by 0 days.

(21) Appl. No.: 16/633,318

(22) PCT Filed: Jul. 24, 2018

(86) PCT No.: PCT/IN2018/050483
§ 371 (c)(1),
(2) Date: Jan. 23, 2020

(87) PCT Pub. No.: WO2019/021309
PCT Pub. Date: Jan. 31, 2019

(65) Prior Publication Data
US 2020/0168135 A1     May 28, 2020

(30) Foreign Application Priority Data

Jul. 24, 2017   (IN) .............................. 201721026254

(51) Int. Cl.
G09F 19/14         (2006.01)
(52) U.S. Cl.
CPC .................................. *G09F 19/14* (2013.01)
(58) Field of Classification Search
None
See application file for complete search history.

(56) References Cited

U.S. PATENT DOCUMENTS

| 7,356,953 | B2 | 4/2008 | Davis | |
|---|---|---|---|---|
| 8,893,413 | B1 | 11/2014 | Shepard | |
| 2002/0155283 | A1* | 10/2002 | Carter | B32B 27/32 428/343 |
| 2003/0086625 | A1* | 5/2003 | Hamid | G06K 9/00026 382/275 |
| 2013/0077163 | A1* | 3/2013 | Shoji | G02B 30/35 359/479 |
| 2015/0243068 | A1* | 8/2015 | Solomon | H01L 27/156 345/419 |
| 2016/0019830 | A1* | 1/2016 | Schlangen | G09G 3/003 345/82 |

OTHER PUBLICATIONS

International Search Report and Written Opinion issued in corresponding International Application No. PCT/IN2018/050483, dated Oct. 31, 2018.

* cited by examiner

*Primary Examiner* — Michelle Chin
(74) *Attorney, Agent, or Firm* — Andrus Intellectual Property Law, LLP

(57) ABSTRACT

The present invention provides a static display along with manufacturing processes of the said static display. The static display comprises two or three distorted images adapted on a corrugated sheet in the form of segments in such a way that only one or two images are distinctly visible at a predetermined angle at a time due to optical illusion created as the spaces of the corrugations are not visible when the display of the present invention is viewed at the predetermined angle.

19 Claims, 3 Drawing Sheets

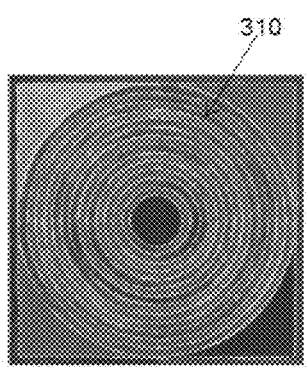
Figure 3A
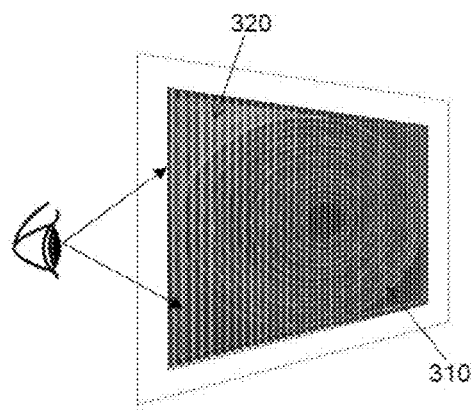
Figure 3B
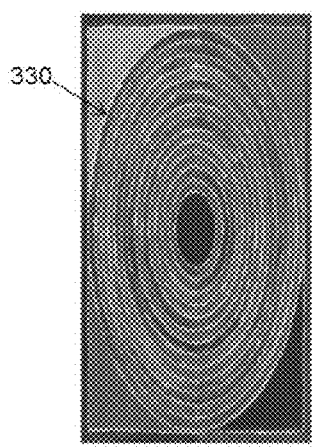
Figure 3C
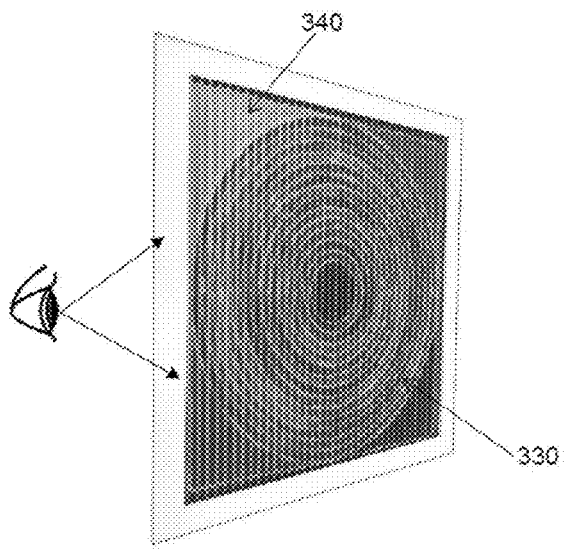
Figure 3D
Figure 3

STATIC DISPLAY AND METHOD FOR MANUFACTURING THE SAME

CROSS-REFERENCE TO RELATED APPLICATIONS

This application is the U.S. national stage application of International Application PCT/IN2018/050483, filed Jul. 24, 2018, which international application was published on Jan. 31, 2019, as International Publication WO 2019/021309 in the English language. The international application is incorporated herein by reference, in its entirety. The international application claims priority to Indian Patent Application No. 201721026254, filed Jul. 24, 2017, which is incorporated herein by reference, in its entirety.

FIELD OF THE INVENTION

The claimed invention in this application relates to a field of static displays. More particularly, the claimed invention is related to a static display that can be used to display one or more same or different photos, arts, advertisements within a single display distinctly visible at a predetermined angle and methods for manufacturing the static display.

BACKGROUD OF THE INVENTION

Display has become integral part of todays life and is also integral way of communication. Displays generally use to display an art, photo, direction, signs and symbols in the houses, societies and company premises, roads malls and vehicles. Displays are also used effectively as advertising means in common places such as indoor advertising means in malls and outdoor advertising means on roads, walk ways foot-over bridges, vehicles etc.

Today, the advertisement functions as an important role of information communication to the people. Various means of advertisements have been developed. Accordingly, the clients are seeking faster and various media to promote their advertising information to the customers. The prime display areas are most in demand. In display of art or printed advertisement, the most important element is its 'location_. Single display, in any form i.e. printed, painted, signages, luminates etc., can display single advertisement at a time. Therefore, the location plays of the advertisement displays most important role and its observed that the prime locations are always expensive. Presently, one can see the static display at the best when a viewer stops a while and stands face-to-face. Only by this way you can see the static display better, for a longer time, get a deeper impression and get registered in your mind. Most of the time people are walking or are on the move. The time span to register the static display while walking or on the move is so less that most of the time the advertisement on the static displays becomes insignificant from the point of its impact.

Therefore, there is necessary of a board or display solving the aforementioned problems.

SUMMARY OF THE INVENTION

Accordingly, the present invention provides means to solve at least one of the aforementioned problems through its various aspects and embodiments.

In the first aspect, the present invention provides a static display comprising a corrugated sheet with a plurality of corrugations having symmetric peaks and troughs spaced apart with left-side slopes and right-side slopes between them, at least two distorted images divided in plurality of vertical segments of predetermined width wherein the vertical segments of first image orderly are adapted on the left-side slopes of the corrugated sheet and the vertical segments of second image orderly are adapted on the right-side slopes of the corrugated sheet. The static display of the present invention can be manufactured by different methods.

In second aspect, the present invention provides one of the methods for manufacturing a static display of the first aspect. According to this aspect, the method comprises the steps of: providing a corrugated sheet with a plurality of corrugations having symmetric peaks and troughs spaced apart with left-side slopes and right-side slopes between them, selecting at least two images and distorting each image proportionally in at least one direction, dividing each distorted image sequentially into a series of a plurality of vertical segments having a predetermined width and adapting the vertical segments of a first image orderly on the left-side slopes of the corrugated sheet and adapting the vertical segments of a second image orderly on the right-side slopes of the corrugated sheet.

In the third aspect, the present invention provides another method of manufacturing of a static display of the first aspect. The said method comprises steps of selecting at least two images and distorting each image proportionally in at least one direction, dividing each distorted image sequentially into a series of a plurality of vertical segments having a predetermined width, adapting the vertical segments of each image orderly and alternatively on a flat sheet, and forming a corrugated sheet of the flat sheet such a way that peaks and trough are formed alternatively at joining lines of the vertical segments.

According to the present invention, the static display of the first aspect manufactured by the methods of the second and third aspects displays a substantially non-fragmented first image solely visible without substantial distortion at a predetermined angle from the left-side of the static display and a substantially non-fragmented second image solely visible without substantial distortion at a predetermined angle from the right-side of the static display.

According to an embodiment of the present invention, said distorting of each image includes either compression, stretching or both of each image in a horizontal direction and/or in vertical direction.

According to an embodiment of the present invention, the static display can comprise maximum three images wherein a third image can be adapted on the static display that can be visible at any angle from the front side of the static display.

According to the present invention, the predetermined angle is an acute angle.

According to an embodiment of the present invention, the first, second third images as selected may be same or distinct images. Advantageously, each image may comprise one or more pictures, arts, advertisements, photos, symbols, signs, letters and the like.

According to the present invention, the predetermined width of the vertical segments of the images is equal to or less than a width of the angular slope extending between the peak and the trough of the corrugations of the corrugated sheet.

Further, according to the present invention, the static display can be opaque or transparent with backlight effect or LE D corrugated display.

According to the present invention, the static display may include photo frames, indoor or outdoor displays for art, indoor or outdoor advertising displays, sign displays or any other display.

BRIEF DESCRIPTION OF THE DRAWINGS

The embodiments of a static display according to the present invention will now be described, by way of example, with reference to the accompanying drawings, in which:

FIG. 1 through 1A-1C shows an exemplary embodiment of a static display comprising two images at various angles according to the present invention;

FIG. 2 through 2A-2C shows another exemplary embodiment of a static display comprising three images at various angles according to the present invention; and FIG. 3 through 3A-3D shows a comparison wherein:

FIG. 3A shows a 'circle_ as a selected image without distortion;

FIG. 3B shows the undistorted selected circle adapted on a corrugated sheet;

FIG. 3C shows a distorted circle before adapting over a corrugated sheet; and

FIG. 3D shows a static display according to the present invention having a distorted circle adapted over the corrugated sheet.

DETAILED DESCRIPTION OF THE INVENTION

Figure 1:
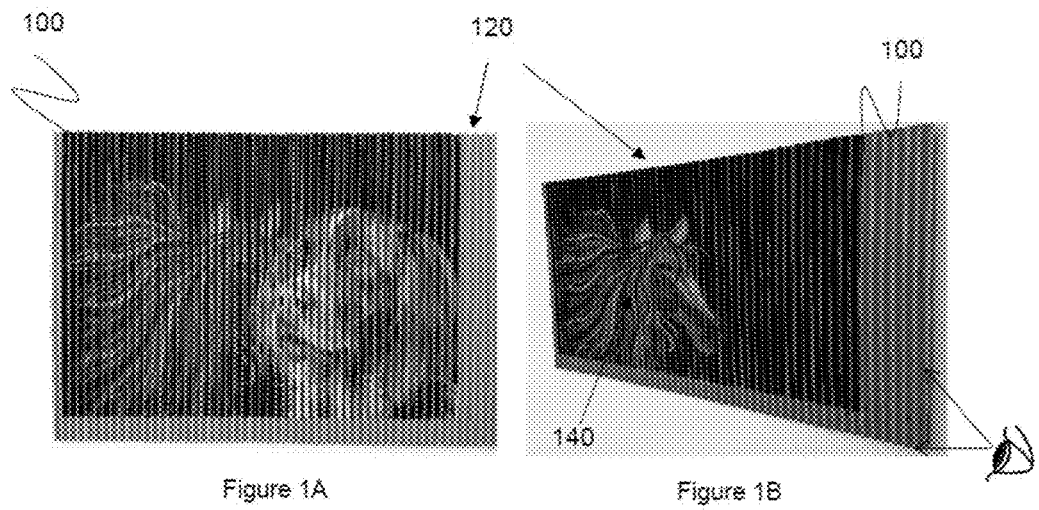
Figure 1:
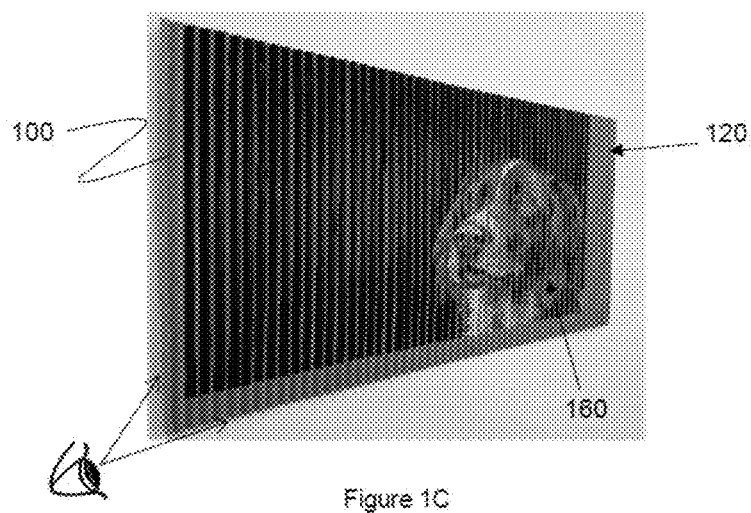

In general, the present invention provides a static display having more than one image within either one given frame, display wall, display window or display spaces and one full image is distinctly visible at a predetermined angle to the static display.

According to an embodiment of the present invention, the static display comprises at least two images. The static display of the present invention can display a substantially non-fragmented first image solely and distinctly visible without substantial distortion at a predetermined angle from the left-side of the static display and a substantially non-fragmented second image solely and distinctly visible without substantial distortion at a predetermined angle from the right-side of the static display. In another embodiment, the static display comprises three images wherein one or two images are visible individually and distinctly at a particular angle to a viewer and the third image can be visible at any angle of the static display. Advantageously, at least one of the three images may be visible at any angle.

According to an embodiment of the present invention, the image can include one or more pictures, photos, symbols, signs, letters and the like. According to the present invention, the images can be same or distinct images.

The present invention provides a display comprising a corrugated sheet having plurality of corrugations having peaks and troughs with slopes at opposite sides between them, at least two images adapted on the corrugated sheet such that each image is visible individually at a time at a particular angle. Advantageously, the image is visible at an acute angle with the board when there are two images.

To manufacture a display, in one method the first image is distorted and divided into a plurality of segments and each segment of the first image is adapted sequentially on the first side of each slope of corrugations of a corrugated sheet. Similarly, a second image is distorted and divided into a plurality of segments and each segment of the second image is adapted sequentially on second side of each slope of the corrugations in such a way that a full first image without substantial fragmentation on first side slopes of the corrugation is clearly visible without substantial distortion when view at a predetermined angle at the static display and a complete second image without fragmentation is clearly visible without substantial distortion when view at a predetermined angle at the second side slopes of the corrugations. Advantageously, the distorted images are divided in vertical segments. In other words, the distorted images are divided into segments parallel to the corrugations of the corrugated sheets According to the present invention, the distortion of the image and width of the plurality segments of the image depend on a number of corrugations and a width of the slope of the corrugation.

In another method for manufacturing the static display comprising steps of selecting at least two images to be displayed, distorting and dividing the said images into number of vertical segments, adapting the segments of images alternatively in an order on a flat sheet and corrugating the flat sheet in such a way that peaks and troughs of the corrugations formed alternatively at the connections of segments.

According to the present invention, the step of dividing each distorted image into the predetermined number of the segments includes measuring a width of slope extending between the peak and the trough of the corrugation and dividing each piece each piece of the image is substantially equal or less than the width of the slope. Advantageously, the image is divided vertically. In other words, the imaged is segmented is parallel to flutes of the corrugation sheet.

According to the present invention, the image may be distorted proportionally in at least one direction to fit within the corrugated sheet so that final image on the corrugated sheet appears full image without substantial distortion and fragmentation. The distortion of the image includes compression, stretching or both in a horizontal direction and/or in vertical direction before dividing into the plurality of segments or formed in order to fit in the corrugated sheet.

According to the present invention, adapting segments on the flat or the corrugated sheet includes gluing, pasting or printing the segments of the images orderly on a flexible flat sheet to be corrugated or the corrugated sheet. The adapting also includes flashing segments of the images over an electronic corrugated display.

According to the present invention, each image can comprise one or more pictures, arts, advertisements, photos, symbols, signs, letters and the like.

According to the present invention, the static display may include photo frames, indoor or outdoor displays for art, indoor or outdoor advertising displays, sign displays or any other display.

According an embodiment, the static display can be a transparent display with backlight effect or LE D corrugated display wherein images can be formed as per the present invention.

FIG. 1 through 1A-1C shows as exemplary embodiment of a static display (100) of the present invention comprising two images individually viewable at different angles.

As shown in FIG. 1, the static display (100) comprises a corrugated sheet (120) and two distorted images (140, 160) adapted on the corrugated sheet such that only one image is distinctly visible at a predetermined angle. As shown in FIG. 1, one image is of a horse (140) and second image is of a dog (160).

When the static display (100) is viewed from a front side of the static display (100) as shown in FIG. 1, the viewer(s)

feels having two images overlapping or merging in each other thereby creating a conflict between the two images and confusion including curiosity in the mind of the viewer(s).

FIG. 1B illustrates the static display (100) tilted/viewed towards/from right-hand side which shows a full and clear image of the horse (140) only without distortion and without fragmentation due to the optical illusion. In other word, when a viewer looks at the board from right hand side, he/she feels that he/she is viewing, as if, a full image of the horse (140) only.

FIG. 1C illustrates the static display (100) tilted/viewed towards/from left hand side which shows a full and clear image of the dog (160) only. In other word, when a viewer looks at the board from the left-hand side, he/she feels that he/she is viewing, as if, a full and clear image of the dog (160) only without distortion and fragmentation due to the optical illusion.

The static display (100) as shown in the FIG. 1 is formed by distorting images of horse and dog. The distortion of the images either include compression, stretching or both of the images. The distortion of the images depends on the type of image as well as width of the slope extending between the peak and trough and number of the corrugations on which the image is to be adapted. According to the present invention the images are distorted in such a way that when the segments of the distorted images is adapted, the distortion gets nullified. The distorted images of the horse and dog are then divided in vertical segments (not shown). As mentioned and claimed in the application, generally width of each vertical segment is equal or less than the width of a slope of a corrugation extending between the trough and the peak of the corrugations of the corrugated sheet (120). The vertical segments are then pasted/adapted on the corrugated sheet (120). As shown in FIG. 1, the vertical segments of the dog (160) are pasted on the left-hand side slopes of corrugations of the corrugated sheet (120) in an order and the vertical strips of the horse (140) are pasted in an order on the right-hand side slopes of corrugations of the corrugated sheet (120). As per another method of the present invention, the segments of the dog and horse can be adapted alternatively on a flat flexible sheet or printed on a flat flexible sheet and corrugated at the connections of the segments to form a display according to the present invention.

Figure 2:
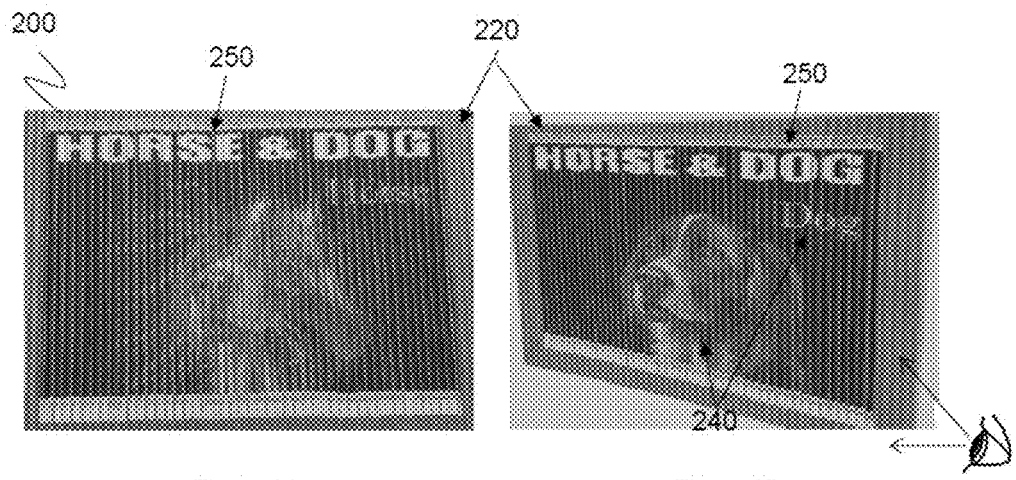
Figure 2:
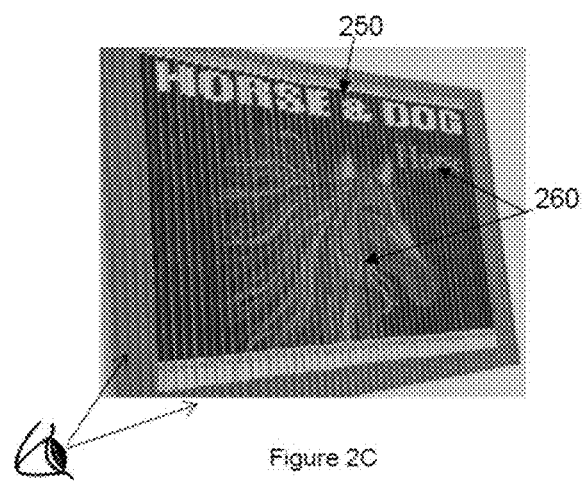

Referring FIG. 2 through 2A-2C shows as exemplary embodiment of the present invention comprising three images.

As shown in FIG. 2, the static display (200) comprises a corrugated sheet (220) and three images (240, 250, 260) adapted on the corrugated sheet (220) such that one or two images are visible clearly at a predetermined angle. As shown in FIG. 2, first image is of a horse (260) with a name 'horse_, second image is of a dog (240) with name 'dog_, and the third image (250) is 'horse and dog_.

FIG. 2A shows the static display (200) viewed from a front side showing the third image (250) visible distinctly and clearly. Further, FIG. 2A also shows two images overlapping or merging in to each other thereby creating a conflict between the two images and confusion including curiosity in the mind of the viewer(s).

FIG. 2B shows the static display (200) tilted/viewed towards/from right hand side with a clear vision of second image (240) and third image (250) only without fragmentation and distortion. In other word, when a viewer looks at the board from right hand side, he/she can view a substantially full undistorted and non-fragmented image of the dog along with name (240) and third image (250) only, without distortion and fragmentation, due to the optical illusion created by the corrugations.

FIG. 2C shows a display (200) tilted/viewed towards/ from left hand side with a clear image of the first image (260) and third image (250) only without distortion and fragmentation by creating optical illusion. In other word, when a viewer looks at the board from left hand side, he/her can view a clear image of the horse along with name (260) and third image (250) only without distortion and fragmentation due to the optical illusion.

The static display (200) in the FIG. 2 is formed by distorting first and second images of horse and dog along with their names along with the third image. According to the present invention, the first image and the second image may comprise the third image in parts or full. Alternatively, the third image may be a separate image. The distortion of the images depends on the type of image as well as width of the slope from peak to trough or vice versa and number of the corrugations on which the image to be adapted such that when adapted the image the distortion gets nullified. Then, the said images are divided into segments. As mentioned and claimed in the application, generally width of each vertical segment is equal or less than the width of a slope of a corrugation extending between the trough and the peak of the corrugations of the corrugated sheet. The vertical strips are then adapted or pasted on the corrugated sheet (220). The vertical segments of the dog image (240) are pasted on the right-hand side slopes of corrugations of the corrugated sheet (220) in an order and the vertical segments of the horse image (260) are pasted in an order on the left-hand side slopes of corrugations of the corrugated sheet (220).

FIG. 3 through FIGS. 3A to 3D shows by way of example comparison between non-distorted image and distorted image adapted on a corrugated sheet according to the present invention.

FIG. 3A shows an image of a non-distorted circle (310) which is adapted after dividng on a corrugated sheet (320) and is shown in FIG. 3B which is viewed from a left-side. As shown in FIG. 3B, the non-distorted circle appears distorted.

FIG. 3C shows an image of distorted circle (330) which is distorted according to the present invention before adapting the image on the corrugated sheet. The distorted circle (330) is divided into plurality of segments according to the present invention and pasted on the corrugated sheet (340) as shown in FIG. 3D. When the distorted circle (330) on the corrugated sheet (340) as shown in FIG. 3D is viewed at an acute angle from the left-hand side as shown in FIG. 3D, a full image of the circle is visible without substantial distortion and fragmentation due to the optical illusion. This example proves that the distortion of the image, which was done before pasting to the corrugated sheet, gets nullified and creates optical illusion in the mind of the viewers who view the distorted image like a non-distorted image on the corrugated sheet without substantial fragmentation and distortion due to the optical illusion.

According to the present invention, the static display may include photo frames, indoor or outdoor displays for arts, indoor or outdoor advertising displays, sign displays or any other display. The static display also includes electronic displays wherein the electronic displays are corrugated, and the segments of distorted images are shown or flashed on the corrugations of the electronic displays orderly according to the present invention that looks a full substantially non-distorted and on fragmented image visible due to the optical illusion when viewed at an acute angle.

The static display of the present invention can be erected parallel to the road or can be adapted to on a wall of parallel to the road for advertising purpose. The road refereed herein includes all type of walkways, vehicle ways such as internal roads, express roads, highways as well as walkways in the malls. The static display may comprise two different advertisement or same advertisement visible from both side at a particular angle to the viewer. The static display of the present invention can be installed on turning roads, walkways displaying two images wherein single image is visible to opposite travelling viewers.

The static display can be a picture frame or an art for homes, art gallery and the like.

According to the present invention, a board comprising the static display of present invention, if viewed from an acute angle from either side, viewer can easily see and/or read the static display. Further, the static display of the present invention having two or three images when view from the front side that is face-to-face, may create a lot of curiosity, conflict and confusion of the images in the mind of viewers as two images overlap or merge with each other and the static display also creates an optical illusion at acute angles using the imposition of the images thereby drawing attention of the viewers. The optical illusion is created as the spaces of the corrugations are not visible when the display of the present invention is viewed at an acute angle. Moreover, the third image can be clearly viewed even when standing in front of the board.

The static display of the present invention has capacity to display two same or distinct images in one single window display. So, the cost of putting up two different display boards for two different images/information will be incurred in just one single display board having two images or single advertisement with maximum coverage and with the possibility of third image. Further, as the present static display can be arranged parallel to the road and the advertisement on the display is easily viewable to the viewers, no specific place arrangement or prime spot as required presently.

The utility of the limited window display space can also be better utilized or double utilized. The static display of the present invention can be made on any size of corrugation shape and from any material as per the users desired and requirements.

It is to be understood that even though numerous characteristics and advantages of the present invention have been set forth in the foregoing description, together with details of the structure and function of the invention, the disclosure is for illustrative purpose only. Changes may be made in the details, especially in matters of shape, size, and arrangement of parts within the principles of the invention. Further, first, second, right side, left side, right hand side, left hand side, horizontal direction, vertical direction etc. are referred in the description for the purpose of the understanding and nowhere limit the invention. The horizontal direction can be longitudinal direction and vertical direction can be transverse direction. Further, the images such as horse, dog, names, circle used/shown in the figures are only for reference and understating purpose of the invention and those do not limitation effect claimed in the present application. Furthermore, modifications, additions, or omissions may be made to the static display, and methods described herein without departing from the scope of the disclosure. For example, the components of the static display may be integrated or separated. Moreover, the methods described may include more, fewer, or other steps. Additionally, steps may be performed in any suitable order such as in the method described as second aspect, steps of providing corrugated sheet and selecting at least two images are independent steps and need not required to be done in an order as claimed in the application which means that steps can be done in any suitable order. As used in this document, 'each_refers to each member of a set or each member of a subset of a set.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims:

The invention claimed is:

1. A method for manufacturing a static display, comprising the steps of:
   providing a corrugated sheet with a plurality of corrugations having symmetric peaks and troughs spaced apart with left-side slopes and right-side slopes between them;
   selecting at least two images and distorting each image proportionally in at least one direction, said distorting of each image including either compression, stretching or both of each image in a horizontal direction and/or in a vertical direction;
   dividing each distorted image sequentially into a series of a plurality of vertical segments having a predetermined width; and
   adapting the vertical segments of a first distorted image orderly on the left-side slopes of the corrugated sheet and adapting the vertical segments of a second distorted image orderly on the right-side slopes of the corrugated sheet thereby providing a static display displaying a substantially non-fragmented first image solely visible without substantial distortion at a predetermined angle from the left-side of the static display and a substantially non-fragmented second image solely visible without substantial distortion at a predetermined angle from the right-side of the static display.

2. The method for manufacturing a static display as claimed claim 1, wherein said predetermined angle is an acute angle.

3. The method for manufacturing a static display as claimed in claim 1, wherein said distorted images include same or distinct images.

4. The method for manufacturing a static display as claimed in claim 1, wherein the predetermined width of the vertical segments of the distorted images is equal to or less than a width of the slope extending between the peak and the trough of the corrugations of the corrugated sheet.

5. The method for manufacturing a static display as claimed in claim 1, wherein maximum three distorted images can be adapted on the static display, and wherein a third distorted image can be adapted that is visible at any angle from the front side of the static display.

6. The method for manufacturing a static display as claimed claim 1, wherein each distorted image includes one or more pictures, arts, photos, symbols, signs, letters, advertisements and the like.

7. The method for manufacturing a static display as claimed claim 1, wherein the static display may include photo frames, indoor or outdoor displays for art, indoor or outdoor advertising displays, sign displays or any other display.

8. The method for manufacturing a static display as claimed in claim 1, wherein said static display can be opaque or transparent with backlight effect or LED corrugated display.

9. A method for manufacturing a static display comprising the steps of:
- selecting at least two images and distorting each image proportionally in at least one direction, said distorting of the image including either compression, stretching or both of each image in a horizontal direction and/or in a vertical direction;
- dividing each distorted image sequentially into a series of a plurality of vertical segments having a predetermined width;
- adapting the vertical segments of each distorted image orderly and alternatively on a flat sheet; and
- forming a corrugated sheet of the flat sheet in such a way that peaks and troughs are formed alternatively at joining lines of the vertical segments thereby providing a static display displaying a substantially non-fragmented first image solely visible without substantial distortion at a predetermined angle from the left-side of the static display and a substantially non-fragmented second image solely visible without substantial distortion at a predetermined angle from the right-side of the static display.

10. The method for manufacturing a static display as claimed claim 9, wherein said predetermined angle is an acute angle.

11. The method for manufacturing a static display as claimed in claim 9, wherein the predetermined width of the vertical segments of the distorted images is equal to or less than a width of the slope extending between the peak and the trough of the corrugations of the corrugated sheet.

12. The method for manufacturing a static display as claimed in claim 9, wherein maximum three distorted images can be adapted on the static display, and wherein a third distorted image can be adapted that is visible at any angle from the front side of the static display.

13. The method for manufacturing a static display as claimed claim 9, wherein the static display may include photo frames, indoor or outdoor displays for art, indoor or outdoor advertising displays, sign displays or any other display.

14. A static display comprising:
- a corrugated sheet with a plurality of corrugations having symmetric peaks and troughs spaced apart with left-side slopes and right-side slopes between them;
- at least two distorted images divided in a plurality of vertical segments of predetermined width, the vertical segments of a first distorted image orderly adapted on the left-side slopes of the corrugated sheet and the vertical segments of a second distorted image orderly adapted on the right-side slopes of the corrugated sheet;
- wherein the static display displays a substantially non-fragmented first image solely visible without substantial distortion at a predetermined angle from the left-side of the static display and a substantially non-fragmented second image solely visible without substantial distortion at a predetermined angle from the right-side of the static display; and
- wherein each distorted image is formed by distorting an image proportionally in at least one direction, said distorting of the image including either compression, stretching or both of each image in in a horizontal direction and/or in a vertical direction of the corrugated sheet.

15. The static display as claimed in claim 14, wherein said predetermined angle is an acute angle.

16. The static display as claimed in claim 14, wherein each distorted image includes one or more pictures, photos, symbols, signs, letters and the like.

17. The static display as claimed in claim 14, wherein the static display includes maximum three distorted images, and wherein the third distorted image may be directly visible at any angle from the front side of the static display.

18. The static display as claimed in claim 14, wherein the static display may include photo frames, indoor or outdoor display boards for art, indoor or outdoor advertising boards, sign boards or any other display.

19. The static display as claimed in claim 14, wherein the static display can be opaque or transparent with backlight effect or LED corrugated display and erected perpendicular to a road or adapted on a wall.

* * * * *